United States Patent [19]
Green

[11] 3,922,780
[45] Dec. 2, 1975

[54] CABLE SPEARING AND CUTTING APPARATUS

[76] Inventor: Cyril Robert Green, Woodside Park, Honesdale, Pa. 18431

[22] Filed: Nov. 4, 1974

[21] Appl. No.: 520,376

[52] U.S. Cl. ............... 30/92; 30/180; 30/182; 30/228; 30/241
[51] Int. Cl.² . B23D 21/06; B26B 27/00; B26D 3/16
[58] Field of Search ........ 30/92, 241, 180, 228, 182

[56] References Cited
UNITED STATES PATENTS

| | | | |
|---|---|---|---|
| 2,281,366 | 4/1942 | Metcalf | 30/92 UX |
| 3,763,738 | 10/1973 | Temple | 30/228 |
| 3,861,035 | 1/1975 | Ramey | 30/92 |

Primary Examiner—Al Lawrence Smith
Assistant Examiner—J. T. Zatarga
Attorney, Agent, or Firm—Bauer & Amer

[57] ABSTRACT

A cable spearing and cutting apparatus to be clamped to a cable including a housing formed with guide slots between which a blade and holder are confined in traveling movement relative to the housing. A chain and lock detachably clamp the cable to the housing while stress distributing and cable support means is interposed between the cable and chain so that when power is applied, the cable is accurately supported, speared and sheared.

13 Claims, 6 Drawing Figures

CABLE SPEARING AND CUTTING APPARATUS

This invention relates to cutting apparatuses and more particularly to a cable cutter and clamp.

In the past, cable shearing or cutting blades have been power operated to spear into and by reason of shear powering force, sever large cables. During such spearing, shearing and severing action, the cable is generally held by a clamp formed by relatively spaced chains or straps extending about and engaging spaced protions of the cable. This enabled the cable to twist, distort and even bow outward between such clamps as the blade was forcefully pressed into and sheared through the cable. Unfortunately, the ability of the cable to shift its position by twisting, distoring and outward bowing produces deleterious and damaging stresses on the blade, the powering equipment and the attendant structures that oftentimes results in undesirable cable cuts and disabling equipment damage.

It has been found that in prior art apparatuses, the blade tends to deform during the cutting of the cable. The mode of deformation is a complex one with the blade experiencing torsional and flexural effects with the end result often being that either the cable is cut unevenly or that the blade breaks, or both. Then, too, when the conventional chain or straps are used as the clamp to hold the blade adjacent the cable, the chain will deform which will cause the cable to do likewise and thereby further compound distortion of the blade and cut. While other means of holding the cable have been devised to minimize distortion during cutting, they are generally expensive and are difficult to adjust to a wide variety of cable sizes and material strengths.

Generally then, the present invention provides a simplified and economical means for surmounting the drawbacks of prior apparatus. A fixture is provided to which is attached an adjustable link chain. A relatively movable blade is mounted in the fixture with the blade being supported in a holder for substantially its length. The holder itself is then supported at a plurality of spaced points as by a pair of drive rods while the fixture is formed with slots in which the holder and blade slides and is guided and the cable to be cut is relatively non-movably secured to the fixture. When power is applied, the blade moves relative to the fixture with slots guiding the blade for an appreciable and essential portion of travel. By the interposition of stress distributing and cable supporting means, the cable twisting movement, deformation and distortion is obviated and blade and equipment damage eliminated.

It is, therefore, an object of the present invention to provide a cable spearing and cutting apparatus operable to effect accurate cuts through large diameter single and multiple conductor cables.

It is another object of the present invention to provide a cable cutter that adjusts easily to a variety of cable diameters.

It is a further object of the present invention to provide a cutting and clamping apparatus that is simple in design and reliable in operation.

Other objects and features of the present invention will become apparent from the following detailed description considered in connection with the accompanying drawings. It is to be understood, however, that the drawings are designed for purposes of illustration only and not as definition of the limits of the invention for which reference should be made to the appending claims.

In the drawings wherein similar numerals denote similar elements throughout the several views.

Figure 1:
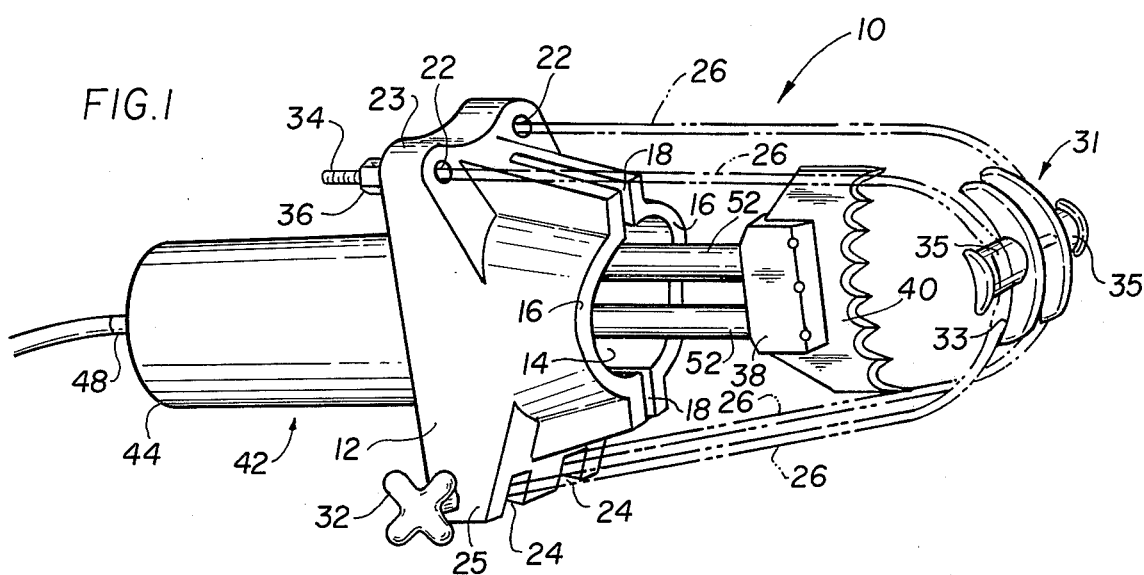
FIG. 1 is a perspective view of the present invention showing the blade being extended and with the cable removed for purposes of clarity.

Referring now to the drawings and particularly to FIGS. 1 to 4, the cable cutting apparatus is generally identified by the numeral 10. The apparatus 10 includes a fixture 12 having a hollow portion or chamber 14. The leading edges of fixture 12 are defined by a pair of frontally disposed lips 16, a portion of which are concave and against which nestles the cable 20 to be cut. A pair of slots 18 are formed in fixture 12 and are disposed diametrically about chamber 14 and so act to separate the distal ends of lips 16 as shown.

A chain or clamping means is adapted to detachably secure cable 20 onto the central and concave portion of lips 16 as follows. In the embodiment shown, the clamping means includes a plurality of apertures 22 forming the rearward skirt 23 of the fixture. A plurality of chain passageways 24 are positioned opposed from apertures 22 and are on another portion 25 of the skirt as can be more clearly seen in FIG. 4.

The clamping means in the preferred structure further includes a pair of link chains or straps 26 each of which is comprised of a plurality of pivotably coupled links. Each passageway 24 includes a pair of pins 28 and 30 disposed laterally therein with the outboard end of pin 30 carrying a handle 32. Each pin 28 is secured across and in a respective passageway 24 while each pin 30 is adapted for slidable engagement across each passageway 24 in a direction coincident with its longitudinal axis. Thus, each pin 30 can slide through and clear of passageway 24 by pulling on handle 32 as described herein. It will be observed that the spacing between each pin pair 28 and 30 in each passageway 24 is such so as to conform to an area of reduced cross section of each link in the chains 26.

One end of each chain 26 is connected to a bolt stem 34 with the stem inserted in respective skirt apertures 22. A nut 36 is threadably coupled onto the extending end of bolt 34 to thereby act as an adjustable stop therefore as the bolt reacts against the skirt. The other end of each chain 26 is inserted in passageway 24 and is positioned therein so as to reside between opposed peripheries of a respective pin pair 28 and 30. Hence, the given link captured between pins 28 and 30 is locked therebetween owing to the increased cross section afforded by the link ends.

Adapted for use with chains 26 is a cable support means generally identified by numeral 31. Support 31 is formed with an elongated concave first surface 33 designed to nestle against a portion of the periphery of cable 20. The support is further defined by a second surface 35 generally co-extensive with first surface 33 but disposed oppositely therefrom. Second surface 35 has a bowed or convex shape making it adapted to concomitantly engage the inboard sides or edges of chains 26, in a manner to be described. Support means 31 acts to lift or space a portion of the chains from the cable periphery and in so doing, distributes the stress on the cable to the area extending along and defined by first surface 33. By extending between each of chains 26, support 31 acts to reduce cable deformation while the blade shears the cable as described below.

A prime mover seen generally by reference numeral 42 includes a housing or cylinder 44 attached to or formed integral with the fixture 12. In the embodiment shown, the prime mover is fluid pressure operated and as such includes a piston 46 disposed in cylinder 44. A fluid inlet means 48 communicates with one face of piston 46 while an outlet means 50 (FIG. 2) communicates with the other. One end of a plurality of drive rods 52 are connected to piston 46 to move therewith while the other ends of the drive rods extend through, and are slidably guided and sealed in, a cap 54. The slidable guided seal between the cap 54 and rods 52 is effected at 56 as is common in the art. An elongated blade holder 38 is attached to each of the free and extending ends of the rods 52 to mount a blade 40 securely and well encompassed therein with the cutting edge thereof facing the cable 20. Holder 38 is designed to support substantially the entire rearward edge and adjacent planar regions of the blade 40 as shown.

Figure 5:
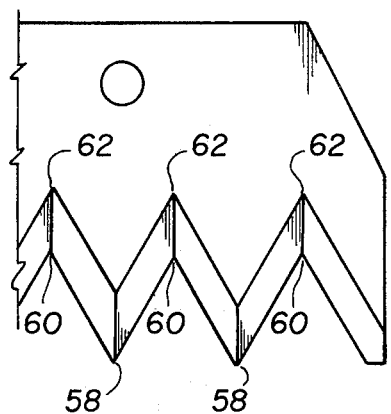
FIG. 5 is an enlarged view of a prior art blade.
Figure 6:
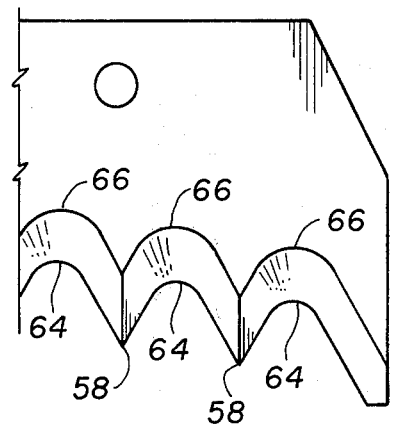
FIG. 6 is an enlarged view of an inventive blade.

Referring now to FIGS. 5 and 6, there is shown in FIG. 5 an enlarged prior art cutting edge and in FIG. 6 an enlarged view of the blade of the present invention. In the prior art of FIG. 5, the blade comprises a plurality of teeth 58 the cutting tips of which are of equal height, thereby presenting a substantially straight cutting front. Further, the teeth are formed from, and defined by, acute notches 60 having complimentary run-outs 62. In use, these notches act as stress raisers and concentrate stress at the notch, thereby reducing blade life. In FIG. 6, the inventive improvement is shown wherein notches 60 of FIG. 5 have been replaced by curved portions 64 and complimentary run-outs 66. Moreover, the teeth are contoured or stepped in height from a given base line to substantially conform to curved shape of the periphery of the cable to be cut. With the construction of FIG. 6, the stress is distributed over a larger area so that the blade experiences a reduced stress and increased life.

Figure 3:
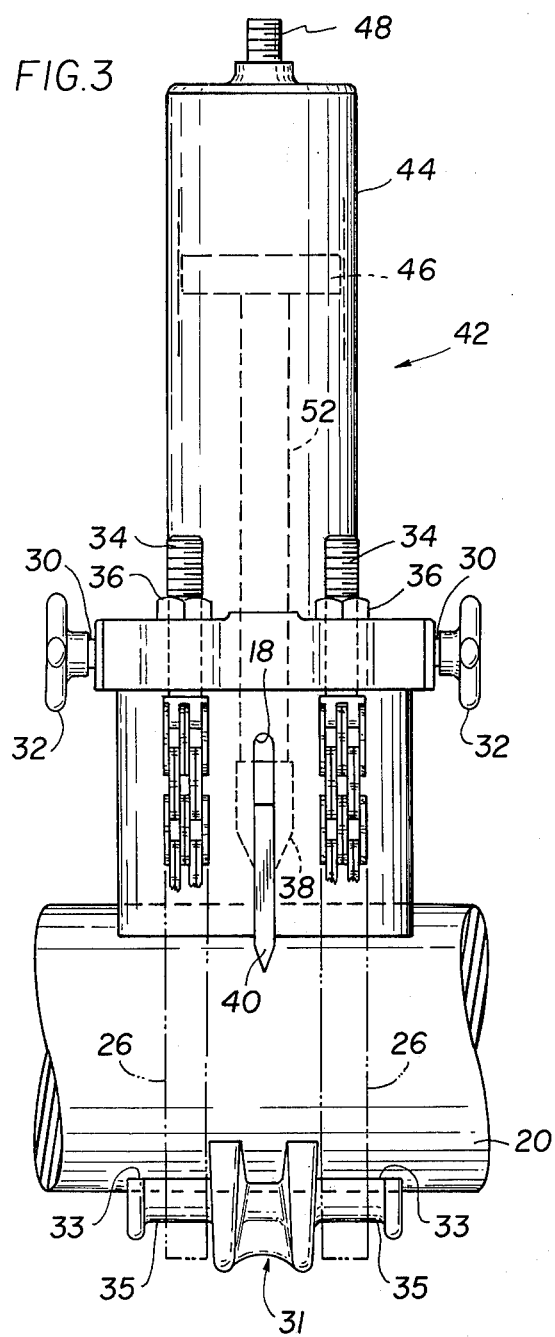
FIG. 3 is a side view of the apparatus shown in FIG. 2.
Figure 2:
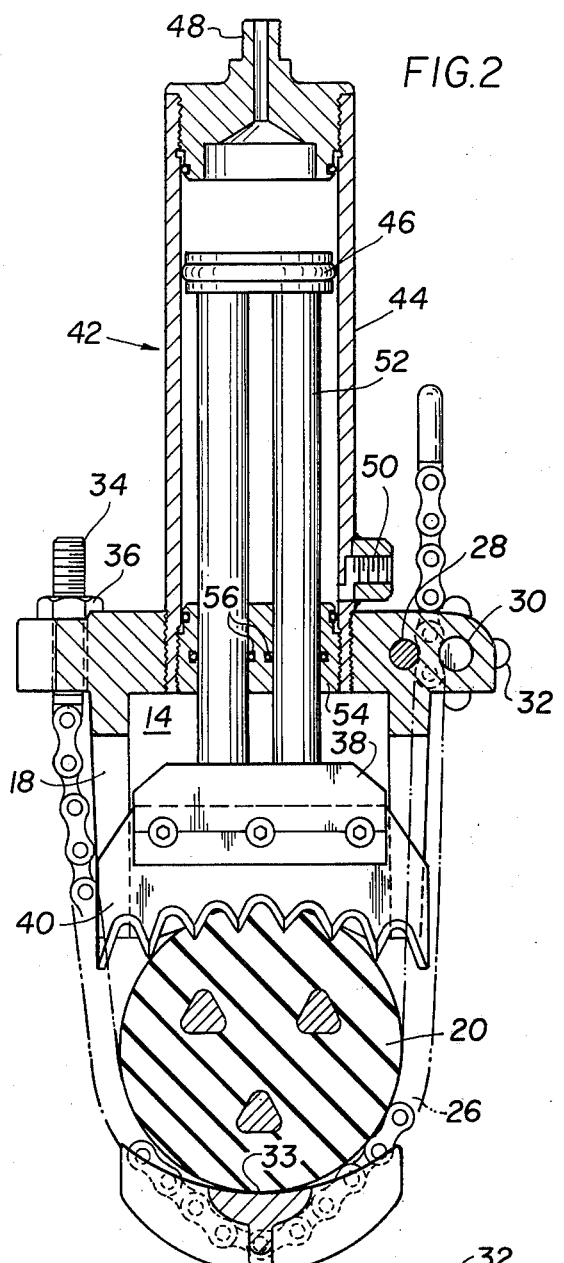
FIG. 2 is a front sectional view of the apparatus of FIG. 1 and shown being clamped to a cable and about to cut the same.

In operation, each handle 32 is pulled from the fixture skirt thereby withdrawing pin 30 and freeing chains 26 from between their respective pin pair 28 and 30. The chains can now be removed from respective passageways 24. Fixture 12 is brought to the cable 20 to be cut and chains 26 are then wrapped thereabout so that the cable is positioned between the inboard edges of the chains and the aforesaid concave portion of lips 16. Before chains 26 are locked between respective pins 28 and 30, cable support 31 is interposed between cable 20 and chains 26 at a position opposed to blade 40 as shown in FIGS. 2 and 3. The imposition of support 31 acts to lift and space a portion of the chains from the surface of cable 20. With a link of each chain abutting a respective pin 28, pin 30 is pushed back into passageway 24 so that the respective link has its area of reduced cross section locked between opposed peripheral portions of pins 28 and 30. At this stage, the chains are only hand tight and contain a minute amount of slack. To further secure the cable, a wrench can be used on nuts 36 to tension the chains and tighten the cable against lips 16.

Figure 4:
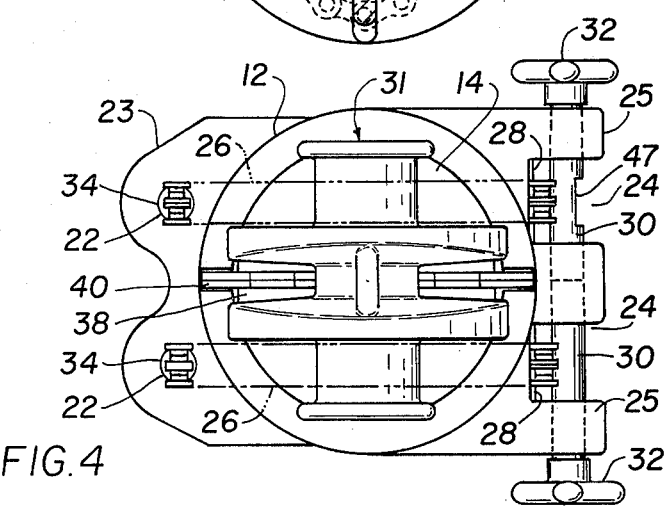
FIG. 4 is an end view of the apparatus shown in FIG. 3 again with the cable removed for purposes of clarity.

In addition to the release afforded chain 26 from passage 24 by pulling on pin 30 until same is clear of the passageway, other means for releasing the chain are possible. For example, it is also contemplated that pin 30 will remain confined across the passageway. When so confined, pin 30, or each one thereof, is formed with a flat 47 as seen in FIG. 4. Pin 30 is then able to rotate about its longitudinal axis while remaining in passageway 24. Selectively rotating or indexing each of pins 30 operates to deposit flat 47 opposed to pin 28. Flat 47 is cut sufficiently into pin 30 so that when placed so opposed, chain 26 can then slide therethrough. To lock the chain, pin 30 is rotated until reaching the approximate position of the last mentioned figure, with the flat away from the chain, where the spacing between opposed pins 28 and 30 locks the chains as above described.

Power is applied that, in the example shown, means applying fluid pressure at inlet 48. This pressurizes one face of piston 46 and effects a relative movement between the piston and cylinder 44. Since rods 52 are attached to piston 46, they are driven thereby and cause relative movement of holder 38 and the blade. The relative movement of the holder with respect to both fixture 12 and cable 20 causes the blade to spear into and progressively shear the cable as the blade slides relative to and in slots 18. During the above sequence, outlet means 50 allows egress of any air or fluid on that side of piston 46 communicating with it. If powered retraction of blade is featured, the prime mover will be double-acting. In a double-acting device, outlet means 50 will admit pressurized fluid which will effect a relative retraction of blade 40 with respect to fixture 12, as inlet 48 allows egress of fluid from cylinder 44. Whether the inventive device is single or double-acting, slots 18 guide and dimensionally confine blade 40. And, it will be noticed that drive rods 52 support the holder at two points so that during travel of the blade and holder, the torsional and flexural stresses reacting thereon are reduced. Cable distortion is obviated by support 31 acting to distribute the stress on the cable over the elongated engaging surface area 33.

While prime mover 42 has been described as utilizing fluid pressure, other means are contemplated. The prime mover might be electrically or mechanically driven, for example. Many power sources are available, indeed, even explosive charges can be employed in mover 42.

While there have been shown and described and pointed out the fundamental novel features of the invention as applied to a preferred embodiment thereof, it will be understood that various omissions and substitutions and changes in the form and details of the device illustrated and in its operation may be made by those skilled in the art without departing from the spirit of the invention. It is the intention, therefore, to be limited only as indicated by the scope of the claims appended hereto.

What is claimed is:

1. An apparatus for spearing and cutting cables comprising
a housing,
clamping means demountably secured to said housing and adapted for engaging the cable periphery,
prime mover means attached to said housing,
cutting means operable for relative movement with respect to said housing, and a plurality of drive rod means on one end attached to said cutting means, and on the other end driven by said prime mover means so that as the cable is cut said plurality of drive rods serve to counteract torsional forces acting on and to limit twisting and flexing movements of said cutting means.

2. The apparatus of claim 1,
wherein said plurality of drive rod means comprises two drive rods for supporting said cutting means at two spaced positions.

3. The apparatus of claim 2,
wherein said cutting means comprises a blade and blade holder, and wherein said housing further includes a cap through which said drive rods slidably move,
and means for slidably sealing said drive rods in said cap.

4. A device for cutting cables which is adapted for clamping onto a cable periphery, comprising
a housing,
guide means formed in said housing,
blade means operable for relative movement with respect to said housing,
means including clamping means detachably secured to said housing and operable to lock the cable thereto and cable support means between said clamping means and the cable to distribute the forces that are exerted by the clamping means over an extended portion of the cable,
and prime mover means for effecting the relative movement of said blade means whereby as said blade means moves relative to said housing, said guide means confines said blade means during at least a portion of the travel thereof.

5. The device of claim 4,
wherein said housing includes a chamber, and wherein said guide means is disposed diametrically about said chamber.

6. The device of claim 5,
wherein said guide means comprises a pair of slots positioned with respect to said chamber so as to substantially divide the same and act to confine the movement of said blade means.

7. A cable cutter and clamp adapted for attachment to the periphery of a cable comprising
a fixture formed with guide slots,
a cutting edge and holder therefor adapted for movement relative to said fixture,
chain means detachably coupled to said fixture and operable to lock the cable to said fixture,
cable support means interposed between said chain means and the cable periphery and placed substantially opposed to said cutting edge and holder,
and prime mover means to effect the relative movement of said cutting edge so that as the cable is sheared and cable support means acts to distribute the stress on the cable to obviate distortion of the cable opposite said cutting edge.

8. The cable cutter and clamp of claim 7,
wherein said chain means comprises a plurality of link chains,
and wherein said cable support means is adapted to concomitantly engage said plurality of link chains thereby to prevent the cable from deforming at said plurality of link chains while the cable is being cut.

9. The cable cutter and clamp of claim 7,
wherein said cable support is defined by a first arcuate surface adapted to fit about a peripheral portion of the cable and a second surface opposed to said first surface for concomitant engagement with said plurality of link chains.

10. A cable cutter including in combination
a housing formed with diametrically opposed guide means,
a blade operable for relative movement with respect to said housing and confined to move in said guide means during at least a portion of the travel thereof,
clamping means disposed in said housing and adapted to lock the cable thereto,
cable support means interposed between a portion of the cable periphery and said clamping means,
a plurality of drive rods having the respective one ends thereof attached to said blade and relatively spaced from each other,
and prime mover means attached to the respective other ends of said plurality of drive rods so that as said prime mover means causes the relative movement of said blade, said cable support means spaces said clamping means from the cable periphery and prevents deformation of the cable to enable the cable to be accurately sheared.

11. The cable cutter of claim 10 wherein said clamping means includes
at least one chain having two ends and formed with a plurality of interconnected links,
pins means attached to one portion of said housing for demountably locking one end of said chain thereto,
and aperture means placed on another portion of said housing for receiving the other end of said chain.

12. The cable cutter of claim 11 wherein each of said links has an area of reduced cross section, and wherein said pin means comprises
at least two pins,
a passageway in said housing that is adapted to receive said pin pair with one of the pins of said pin pair being operable to release said chain from said passageway.

13. The cable cutter of claim 12,
wherein said clamping means further comprises an additional chain,
and an additional one of said passageway and cooperating pin pair so that each one of said chains is adapted for detachable securement in a respective passageway whereby the cable is nestled against said housing as said chains extend thereabout.

* * * * *

UNITED STATES PATENT OFFICE
CERTIFICATE OF CORRECTION

PATENT NO. : 3,922,780
DATED : December 2, 1975
INVENTOR(S) : CYRIL ROBERT GREEN It is certified that error appears in the above-identified patent and that said Letters Patent are hereby corrected as shown below:

IN THE CLAIMS:

Claim 7, line 13, change "and" to --said--

Claim 11, line 5, change "pins" to --pin--

Signed and Sealed this second Day of March 1976

[SEAL]

Attest:

RUTH C. MASON
Attesting Officer

C. MARSHALL DANN
Commissioner of Patents and Trademarks